United States Patent Office 3,234,186
Patented Feb. 8, 1966

3,234,186
TERPOLYMERS CONTAINING MALEIC ANHYDRIDE, VINYL ACETATE AND ESTERS OF AN ALPHA,BETA UNSATURATED ACID
Peter J. V. J. Agius and Joan Daphne Bryan, Abingdon, and Thomas A. Garbett, Botley, near Oxford, England, assignors to Esso Research and Engineering Company, a corporation of Delaware
No Drawing. Original application Aug. 11, 1958, Ser. No. 754,153, now Patent No. 3,087,893, dated Apr. 30, 1963. Divided and this application Feb. 7, 1963, Ser. No. 266,772
4 Claims. (Cl. 260—78.5)

The present invention relates to oil additives comprising oil-soluble copolymeric products derived from maleic anhydride and unsaturated esters of carboxylic acids, and also relates to improved methods of making such polymeric additive compounds.

This application is a division of Serial No. 754,153, entitled "Copolymers of Maleic Anhydride and Unsaturated Esters," filed August 11, 1958, now U.S. Patent 3,087,893.

The use of additive compounds for oils to improve the detergent properties and other properties of such oils is well-known. Such additives when added to lubricating and fuel oils used in internal combustion engines, inhibit corrosion, cylinder wear, and the formation of carbon and varnish on the working parts. While conventional detergent additives, particularly metal-containing compounds have proved advantageous in the past, their excessive use, or use under severe conditions, may result in the formation of high ash residues within the engine with consequent lowering of engine efficiency. Such considerations also apply to fuel oils which contain additives, such as pour-point depressants.

It has now been discovered that oil-soluble copolymeric oil additives which do not result in ash formation and which donate unusually high detergent, VI improving and your depressant activities when incorporated in oil compositions suitable for use in internal combustion engines are obtained by copolymerizing maleic anhydride with an alkyl ester of an $\alpha,\beta$ unsaturated dicarboxylic acid, and a copolymerizable alkylene ester of a $C_1$-$C_6$ monocarboxylic acid.

It is preferred that the esters of di- and mono-carboxylic acids used to form the copolymers of the present invention are so chosen that a mixture of relatively long and short aliphatic side chains are disposed along the polymer chain. Thus the relatively long side chains may be provided by $C_8$-$C_{20}$ alkyl ester of the $\alpha,\beta$, unsaturated dicarboxylic acid, e.g. esters derived from $C_8$-$C_{20}$ alcohols. Enhanced detergency is provided by using straight-chain alcohols rather than branched chain alcohols. The preferred $\alpha,\beta$ unsaturated dicarboxylic acids are $C_4$-$C_6$ aliphatic acids and preferably fumaric acid, although maleic or itaconic acids may be used. The relatively short side-chains are preferably provided by using $C_2$-$C_6$ alkylene esters of $C_1$-$C_6$ carboxylic acids, preferably vinyl or allyl esters, and particularly vinyl acetate.

The molar proportions of the monomers preferably used in preparing the copolymers according to the present invention are:

|  | Preferred, percent | Particularly preferred, percent |
|---|---|---|
| Maleic anhydride | 2-15 | 10-12 |
| Alkyl ester of $\alpha,\beta$ unsaturated dicarboxylic acid | 25-50 | 35-45 |
| Alkylene ester of $C_1$-$C_6$ monocarboxylic acid | 40-70 | 45-55 |

The molecular weights of the final copolymers may vary between wide limits, e.g. 10,000 to 100,000 Staudinger, preferably 50,000–100,000.

5% by weight of such copolymers are capable of suspending at least 55 wt. percent of sludge in the used oil sludge test, hereinafter described, and raising the VI by at least 10 units in a paraffinic oil having an initial viscosity of 12 cs. at 210° F. and an initial VI of 104.

Oil concentrates of the copolymeric materials hereinbefore described may be incorporated in lubricating or fuel oils in proportions so as to give effective and economic concentrations of the copolymeric material. Generally, from 0.5% to 10% by weight of the copolymeric material in the final oil, as used in the internal combustion engine, will endow the oil with the desired properties, although proportions in excess, or less than this, may be required, depending on the potency of the particular copolymer used. Thus for motor lubricants sufficient additive should be added so that the final viscosity index of the oil is raised to about 95 to 160. The additives of the present invention also have the effect of increasing the viscosity of the oil in which they are incorporated. The final oil viscosity should be made to correspond to the requirements of the oil, e.g. SAE 10–30 motor oil. Generally about 5 wt. percent of the additive will be found sufficient to provide these properties.

When the copolymeric materials are incorporated in lubricating oils, it is preferred that mineral lubricating oils be used, although oils derived from animal or vegetable sources may also be used, as may be synthetic lubricating oils, especially those comprising complex esters of diesters, or mixtures thereof.

The additives may also be incorporated with advantage in fuel oils, such as diesel oils, gas oils and kerosenes. In such lighter oils, 0.1% to 4% by weight is used.

Oil compositions containing the additives of the present invention may also include conventional fuel or lubricating oil additives, such as oil-soluble sulphonates, metal salts of alkyl phenol sulphides, and extreme pressure, anti-wear and anti-oxidant additives.

The copolymers of the present invention may be prepared by any well-known process, such as low temperature Friedel-Crafts polymerisation, ionic or radiation polymerisation processes. Free-radical-producing catalysts, e.g. peroxide-type catalysts are particularly useful, such as benzoyl, acetyl, stearoyl or urea peroxide.

The present invention may be illustrated by the following example.

EXAMPLE 1

The following mixture was polymerized at 60° C. under reflux for 24 hours, using benzoyl peroxide as a catalyst:

|  | Parts by weight |
|---|---|
| Lauryl fumarate | 75 |
| Vinyl acetate | 19 |
| Maleic anhydride | 4 |
| Benzoyl peroxide | 2 |
| Lauryl alcohol (used as reaction modifier) | 2 |

The polymeric product was stripped under vacuum and 5% by weight was dissolved in a paraffinic mineral oil having the properties shown, i.e. a viscosity at 210° F. of 12 cs. and a viscosity index of 104. The solution was designated Blend "A."

The properties of this blend are given in Table I.

*Table 1*

|  | Base oil | Blend "A" |
|---|---|---|
| Kinematic viscosity in c.s. at 100° F | 108 | 145 |
| Kinematic viscosity in c.s. at 210° F | 12 | 16 |
| Viscosity index | 104 | 117 |
| Percent vol. dry used oil sludge suspended | 3 | 75 |

The sludge suspending ability of the oils in the above example was determined by measuring the amount of dry used engine oil sludge that the blend would hold in suspension, using 10 grams of dried used oil sludge and 90 grams of the blend. The blend plus sludge was heated to 200° F. in an oil bath under constant stirring. The mixture was allowed to settle for 24 hours at 200° F., and the top 25 cc. of the mixture was poured into a centrifuge and diluted with hexane to a total volume of 100 cc. The mixture was then centrifuged. The percentage weight of solids collected is a measure of the detergent powers of the blend.

An important modification of the present invention is concerned with an improved method of preparation of the copolymers of the present invention whereby they impart an enhanced viscosity index and detergency to oil solutions containing them.

It has now been discovered that if a free radical catalyst which decomposes at a temperature above 70° C. is used to copolymerize the monomers, an improved copolymeric product is obtained compared with a similar product obtained using a free radical catalyst decomposing below 70° C. such as benzoyl peroxide. The preferred catalyst used in this improved process is tertiary butyl perbenzoate. Other catalysts which may be used are tertbutyl hydroperoxide, 2,2-bis-(tert-butyl-peroxy butane), di-tertiary-butyl peroxide, di-cumyl peroxide.

It is of course necessary to carry out the copolymerisation at a temperature below the temperature at which degradation of the monomer and copolymer reactants occurs, for example above 200° C. However, this upper limiting temperature is easily ascertainable by a chemist. Another way of defining this improved process is that the copolymeric reaction is carried out at a temperature between 70° and 100° C., using a peroxide catalyst which does not decompose below 70° C.

The catalyst may be used in the form of an oil solution or slurry, and the reaction is preferably carried out under an inert gas, e.g. nitrogen, the reactants being agitated, either by stirring or bubbling the inert gas through the mixture. The reaction is carried out for a period of time sufficient to copolymerize the reactants, but not for a time long enough to form an insoluble gel. Thus after several hours of steadily increasing viscosity complete polymerisation is indicated by a relatively sudden increase in viscosity. A preferred criterion is to continue the reaction until the mixture reaches a viscosity of about 400 stokes at the reaction temperature, and then dilute the reaction mixture with an oil, the copolymer being stripped under vacuum. The oil-concentrate of the stripped polymer may then be incorporated in oils, e.g. hydrocarbon fuel or lubricating oils as desired.

The catalyst may be used in proportions up to 1% or more based on the total reaction mixture.

The beneficial effect obtained by this improved process may be illustrated by the following example.

EXAMPLE 2

The following monomer mixture was prepared:

| | Percent by weight |
|---|---|
| Lauryl fumarate | 75.2 |
| Lauryl alcohol (reaction modifier) | 2 |
| Vinyl acetate | 18.8 |
| Maleic anhydride | 4 |

The monomer mixture was then divided into two parts, part A being copolymerised at 60° C. using 1% benzoyl peroxide and part B being copolymerised at 90° C. using 0.4% tertiary butyl perbenzoate. Copolymerisation was continued in both instances until a reaction mixture having a viscosity of 400 stokes at the reaction temperature was obtained. This final viscosity corresponds to substantially complete polymerisation of the reactants, and a relatively sudden increase in the rate of thickening of the reactants to this value occurred after several hours reaction time. The copolymeric products were diluted with an SAE 10 type paraffinic oil. The solution was then stripped under a reduced pressure of 5 mm. Hg at 100° C., until the solution contained 50% of the active polymer.

The copolymer/oil concentrate obtained by the above procedure was then added to a mineral lubricating oil of kinematic viscosity 5.1 cs. at 210° F. to produce blends containing 5% of active ingredient.

Table II shows the properties of these blends. The sludge suspending ability of the blends was determined in the same manner as in Example 1.

*Table II*

| | Blend containing Part "A" copolymer | Blend containing Part "B" copolymer |
|---|---|---|
| Kinematic viscosity, 100° F., cs | 45.7 | 57.9 |
| Kinematic viscosity, 210° F., cs | 7.82 | 10.46 |
| V.I. | 137 | 146 |
| Sludge suspended, percent | 60 | 70 |

It is to be noted that using identical monomeric mixtures, polymerisation at a temperature above 70° C. using tert butyl perbenzoate catalyst produced a superior product over that obtained by reaction at 60° C. using benzoyl peroxide catalyst, in that both the VI and the sludge dispersancy of oils containing it were enhanced.

What we claim is:

1. An oil-soluble polymer prepared from 2 to 15 mol percent of maleic anhydride, 40 to 70 mol percent of vinyl acetate, and 25 to 50 mol percent of an ester derived from a $C_8$ to $C_{20}$ aliphatic alcohol and an alpha,-beta-unsaturated dicarboxylic acid, said polymer having a Staudinger molecular weight in the range of 10,000 to 100,000.

2. Oil-soluble polymer as defined by claim 1 wherein said ester is a $C_8$ to $C_{20}$ aliphatic alcohol fumarate.

3. A process for preparing an oil-soluble polymer which comprises copolymerizing a mixture of from 2 to 15 mol percent of maleic anhydride, 40 to 70 mol percent of vinyl acetate, and 25 to 50 mol percent of an ester derived from a $C_8$ to $C_{20}$ aliphatic alcohol and an alpha,beta-unsaturated dicarboxylic acid at a temperature between 70° and 100° C. in the presence of tert. butyl perbenzoate for a time sufficient to form a copolymer having a Staudinger molecular weight in the range of 10,000 to 100,000.

4. A process for preparing an oil-soluble polymer which comprises copolymerizing a mixture of from 2 to 15 mol percent of maleic anhydride, 40 to 70 mol percent of vinyl acetate, and 25 to 50 mol percent of a $C_8$ to $C_{20}$ aliphatic alcohol fumarate in the presence of a catalytic amount of tertiary butyl perbenzoate at a temperature in the range of 70° to 100° C. for a period of time sufficient to achieve a kinematic viscosity of about 400 stokes at the reaction temperature.

References Cited by the Examiner

UNITED STATES PATENTS 2,810,744  10/1957  Popkin _____ 260—78.5
2,825,717  3/1958   Cashman _____ 260—78.5

FOREIGN PATENTS 758,203  10/1956  Great Britain.

JOSEPH L. SCHOFER, *Primary Examiner.*

DONALD E. CZAJA, LEON J. BERCOVITZ,
*Examiners.*